Aug. 13, 1935.  E. J. KINGSBURY ET AL  2,011,487

AUTOMATICALLY OPERATED TURRET AND TOOL UNIT STRUCTURE

Filed June 4, 1934   11 Sheets-Sheet 1

Inventors:
Edward J. Kingsbury
and Gunnar Swahnberg,
by Sturtevant & Mason
Att'ys.

Aug. 13, 1935.   E. J. KINGSBURY ET AL   2,011,487
AUTOMATICALLY OPERATED TURRET AND TOOL UNIT STRUCTURE
Filed June 4, 1934    11 Sheets-Sheet 2

Fig.3.

Inventors:
Edward J. Kingsbury
and Gunnar Swahnberg,
by Sturtevant + Mason
Attys.

Aug. 13, 1935. E. J. KINGSBURY ET AL 2,011,487
AUTOMATICALLY OPERATED TURRET AND TOOL UNIT STRUCTURE
Filed June 4, 1934 11 Sheets-Sheet 6

Inventors:
Edward J. Kingsbury
and Gunnar Swahnberg,
by Sturtevant & Mason
Att'ys.

Aug. 13, 1935.  E. J. KINGSBURY ET AL  2,011,487
AUTOMATICALLY OPERATED TURRET AND TOOL UNIT STRUCTURE
Filed June 4, 1934   11 Sheets-Sheet 7

Inventor:
Edward J. Kingsbury
and Gunnar Swahnberg,
by Sturtevant & Mason
Att'ys.

Aug. 13, 1935.  E. J. KINGSBURY ET AL  2,011,487
AUTOMATICALLY OPERATED TURRET AND TOOL UNIT STRUCTURE
Filed June 4, 1934  11 Sheets-Sheet 8

Inventor:
Edward J. Kingsbury
and Gunnar Swahnberg,
by Sturtevant & Mason,
Att'ys.

Aug. 13, 1935.  E. J. KINGSBURY ET AL  2,011,487
AUTOMATICALLY OPERATED TURRET AND TOOL UNIT STRUCTURE
Filed June 4, 1934  11 Sheets-Sheet 9

Inventors:
Edward J. Kingsbury
and Gunnar Swahnberg,
by Sturtevant & Mason,
Attys.

Patented Aug. 13, 1935

2,011,487

UNITED STATES PATENT OFFICE 2,011,487

AUTOMATICALLY OPERATED TURRET AND TOOL UNIT STRUCTURE

Edward Joslin Kingsbury and Gunnar Swahnberg, Keene, N. H., assignors to Kingsbury Machine Tool Corporation, Keene, N. H., a corporation of New Hampshire Application June 4, 1934, Serial No. 729,006

14 Claims. (Cl. 29—50)

The present invention relates to mechanism including a turret and tool devices which are associated for automatic operation.

One of the features of the present invention is the provision of means in the turret structure whereby a source of power which operates constantly in one direction and preferably at a uniform rate of speed is employed for producing successively a long advancing movement and then a short retrograde movement of the turret, along with the employment of detent means for limiting the retrograde movement to determine the end of a cycle.

Another feature of the present invention is the interconnection of turret structure and machine tool structure whereby the turret when released automatically performs a cycle of movement and comes to a standstill, and therewith is capable of initiating a movement of tool devices, and in which the tool devices automatically complete a working movement and then are capable of initiating a further indexing movement of the turret; with the inclusion of means for preventing repeated operations of the turret or of the tool devices prior to the alternate action of the tool devices or turret respectively.

A further feature of the present invention is the provision of such a mechanism in which a turret or like structure is held in each cycle by a detent which operates to prevent retrograde movement, and in which each cycle of movement comprises a long advancing movement of the turret, followed by a short retrograde movement thereof, the driving and connecting means for the turret including devices which yield while the turret is detained against a retrograde movement.

Still another feature of the present invention is the provision of mechanism of this type in which a turret structure is provided with a source of power therefor and connecting means between the same, the connecting means including devices which produce the long advancing movement and then the short retrograde movement, and also including means for compensating within the connecting means the portion of the retrograde movement in the connecting means which is not permitted to occur during each cycle, by the operation of the detent for the turret, so that the long advancing movement is permitted to occur without requiring the completion of the retrograde movement by the turret itself.

Still another feature of the present invention is the provision of a particular type of traveling gearing including a fixed gear and a bodily moving and rotating gear, with means operated from a cycloidally moving point of the moving gear for producing in succession a long advancing and a short retrograde movement of the turret or like structure.

A still further feature of the present invention is the provision of a turret and a detent means therefor, the detent being operated by the turret during the advancing movement thereof, and then automatically returning for reengagement in blocking position with the turret during a retrograde movement of the latter; with a particular feature whereby the movement of the detent is employed for moving a switch or like control element of the general control system for the mechanism.

With these and other features as objects of the invention, an illustrative form of construction is set forth in the accompanying drawings.

Figure 1:
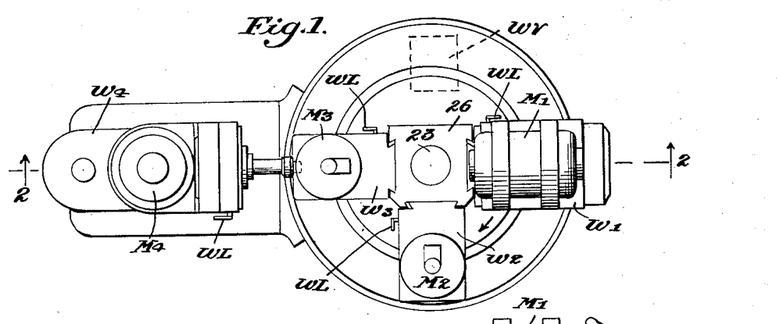
Figure 1 is a plan view of the structure including the turret mechanism and four independently operable work units.
Figure 2:
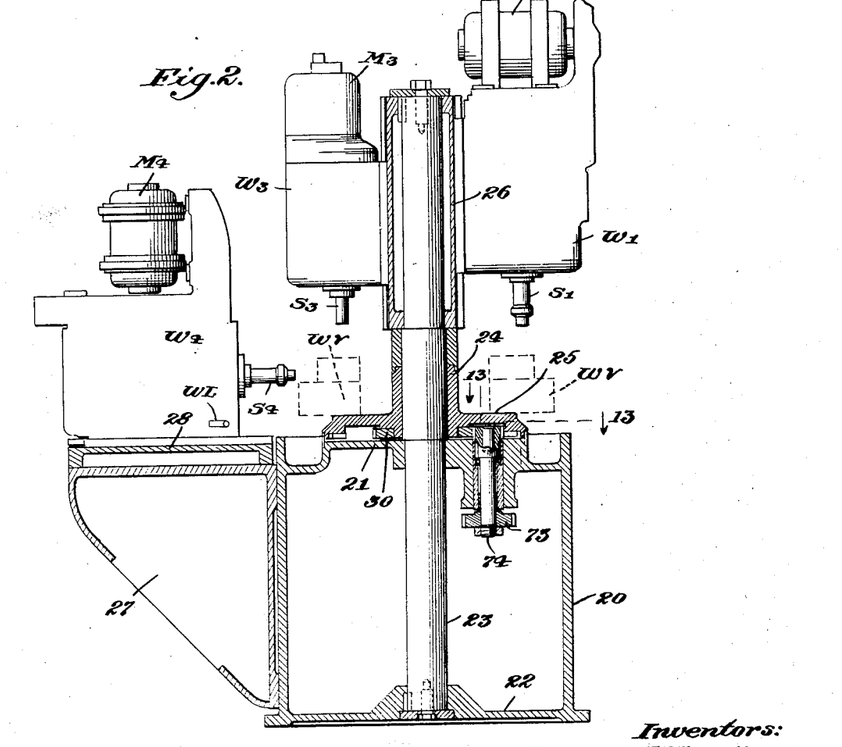
Figure 2 is an upright sectional view substantially on line 2—2 of Figure 1, but showing certain of the work units in elevation, and with the turret control mechanism removed.

In Figures 1 and 2, a hollow base or pedestal 20 has the upper and lower closure plates 21, 22 which support the central upright column 23 which extends above the plate 21 and guides the sleeve 24 which is illustrated as formed integral with the turret table 25 having an appropriate number (here four) of work receiving vises WV which are to be positioned by the turret mechanism. An upper sleeve 26 on the center column 23 is provided with slideways for receiving the housings of three work units W1, W2, W3, each of which has a locking gib structure including a locking and unlocking handle WL. These units may be of any desired type and are illustrated as of the types described in the applications filed by Edward J. Kingsbury, Serial No. 633,888, filed September 19, 1932 and Serial No. 628,395, filed August 11, 1932. In the illustrated form these units are provided with the rotatable and vertically movable tool holding spindles S1 . . . S3, respectively. In the illustrated form, further, a rigid angular bracket 27 is fixed to the standard 20 and has an upper table 28 which provides a slideway upon which is mounted the housing of a further work unit W4 having a rotatable and horizontally movable spindle S4. As described in the aforesaid applications, each of these work units comprises a source of power indicated as the motors M1, M2, M3, M4 for turning the spindle and for producing feeding movements thereof; but it will be understood that the present invention is not limited solely to such particular forms of work units and that the general structure may contain, and the turret mechanism be cooperative with, work units of various types. In the particular illustration, the individual units may be adjusted and clamped upon their respective slideways in proper positions for attaining the desired operations of the tools controlled and actuated thereby.

The turret sleeve and table assembly is provided with a driving gear 30 which is fixed thereto, by which the turret is successively advanced or indexed so that the several work holding vises WV are positioned properly with respect to the tool holding spindles S1 . . . S4 of the several work units.

Figure 13:
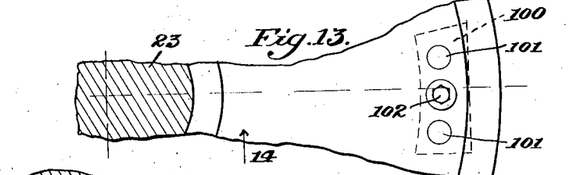
Figure 13 is a detail sectional view substantially on lines 13—13 of Figures 2 and 14.
Figure 14:
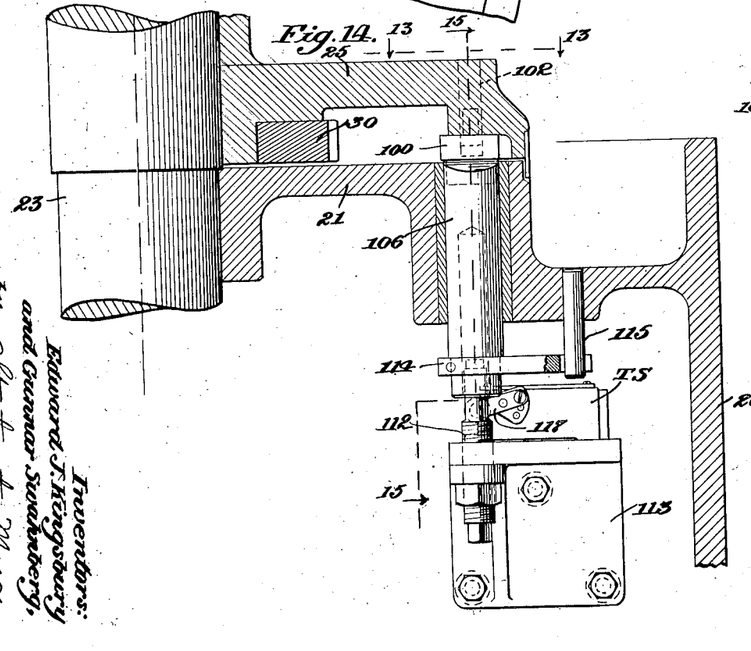
Figure 14 is an upright sectional view of the same detail substantially on lines 14—14 of Figures 13 and 15.
Figure 15:
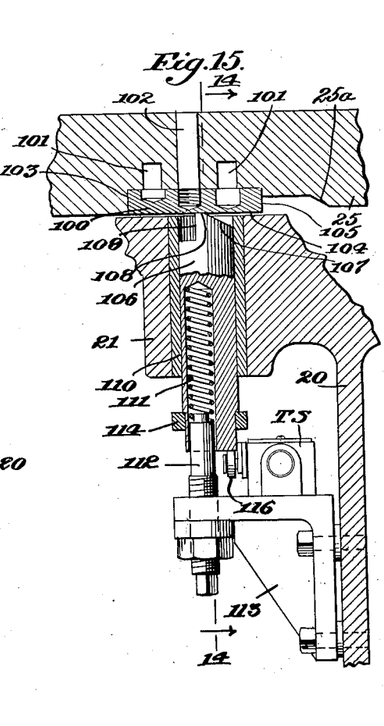
Figure 15 is an upright sectional view of the same detail substantially on line 15—15 of Figure 14.

This movement of the turret table is attained by the mechanisms shown in Figures 3 to 12, inclusive, with a detaining of the turret accurately at the positions of successive stations by a structure such as that illustrated in Figures 13 to 15.

Figure 5:
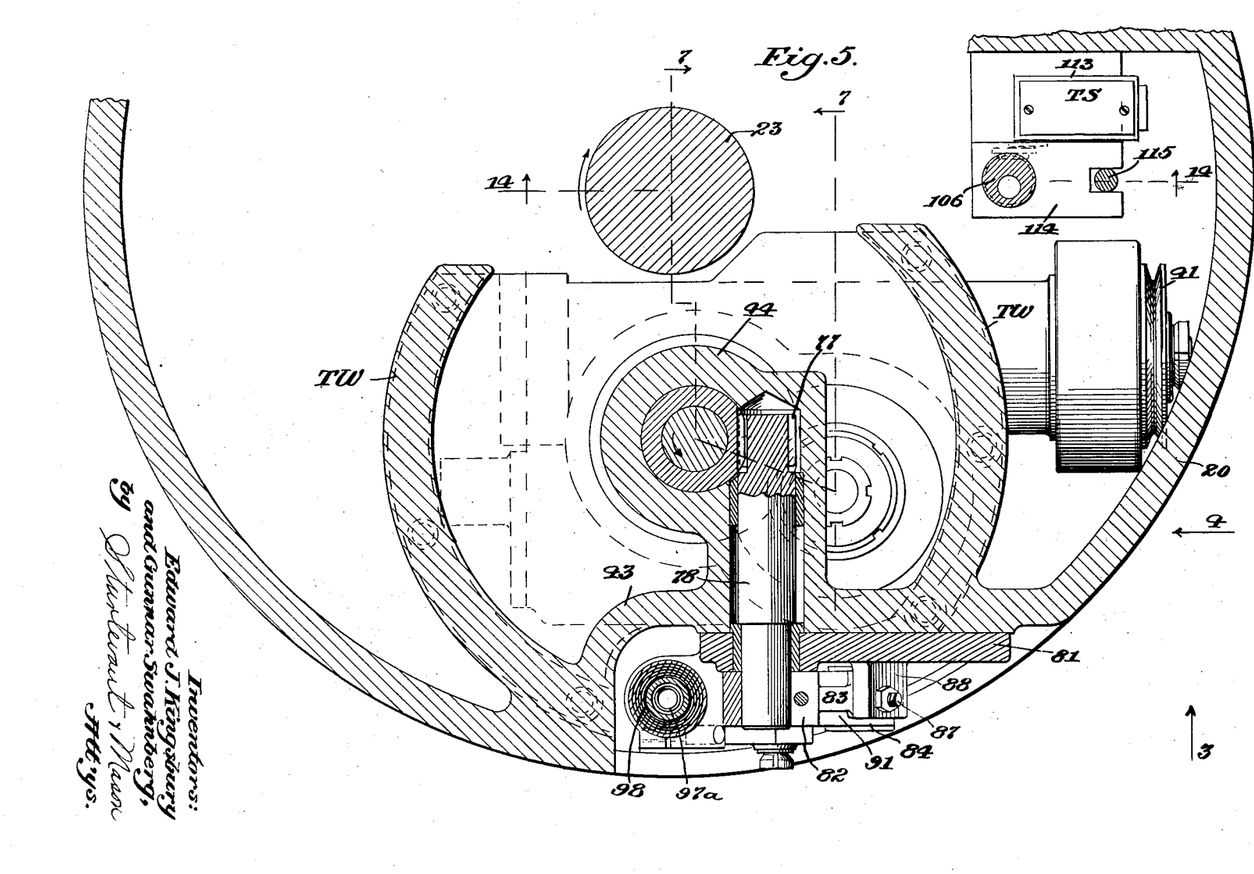
Figure 5 is a horizontal sectional view substantially on lines 5—5 of Figures 3 and 7.

Within the hollow standard 20 is mounted a turret driving motor TM (Figure 3) which is connected by a belt 40 with a pulley 41 fixed on a shaft 42 contained within the general housing TH which is fixed to a supporting and protecting structure including the walls TW which are illustrated in Figure 5 as formed integral with the cylindrical wall of the standard 20 and including a chordal wall portion 43 having an extension 44 which (Figure 7) is integral with upper closure plate 21 of the standard. Thus a very rigid structure is afforded for supporting the housing TH.

The shaft 42 is supported by anti-friction bearings 45 in the housing TH and is connected at its inward end with clutch plates of a clutch device 46 having cooperative plates connected with the shaft 47 of a worm 48. The worm shaft is supported at one end by anti-friction bearings 49 within the shaft 42 and its other end by an anti-friction bearing 50 competent to resist radial loads and end thrusts and carried by a sleeve 51 which is slidable axially with respect to the shaft 42, normally being urged toward the right in Figure 3 by the spring 52 which engages the thrust member 48a and operates as a turret maintaining spring and as an engaging spring for the clutch device, as will be described in detail hereinafter. The effort exerted by spring 52 may be regulated by adjustment of the screw 53 which moves the abutment plate 54 of the spring.

The worm 48 is in mesh with a wormwheel 55 (Figures 6 and 7) which is keyed to a hollow rotatable sleeve 56 supported by the anti-friction bearings 57 and 58 in web walls of the housing TH (Figure 7), and is provided at its lower end with a radially extending arm 59. Within this arm is journaled the shaft 60 to which is fixed a traveling gear 61 which is constantly in mesh with gear teeth 62 illustrated as constituting a part of the closure plate 63 of the housing TH. As the sleeve 56 and its arm 59 are rotated, the gear 61 is carried bodily in rotation about the axis of the sleeve 56 and likewise caused to rotate with its own shaft 60.

Figure 7:
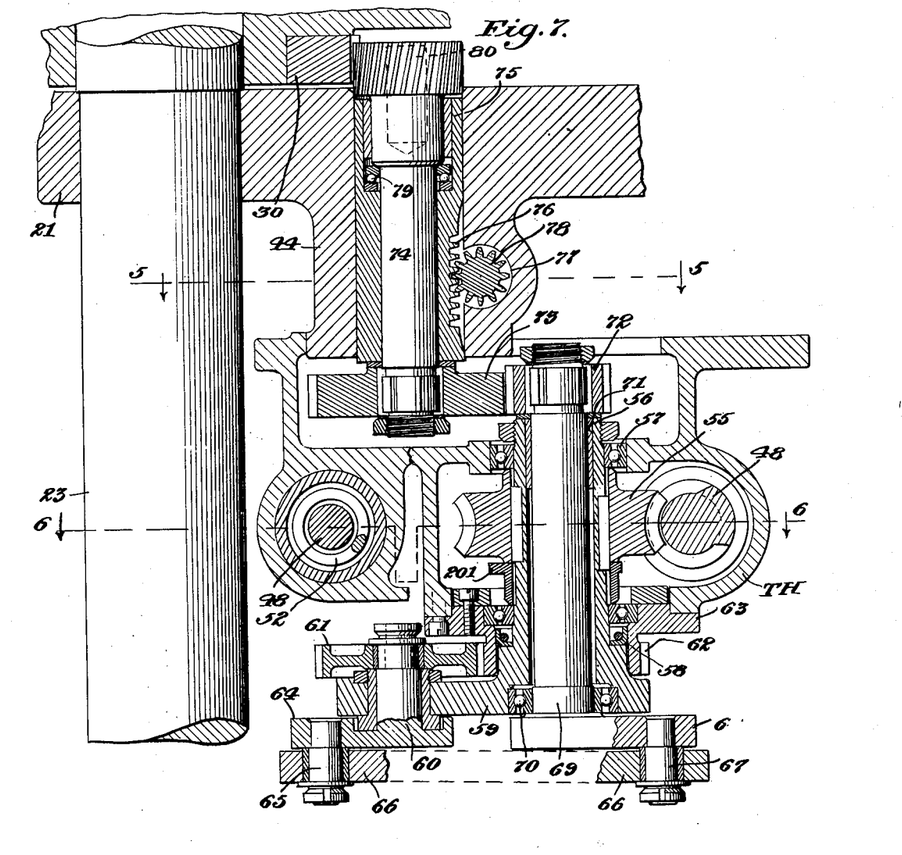
Figure 7 is an upright sectional view substantially on the broken lines 7—7 of Figures 5 and 6.
Figure 8:
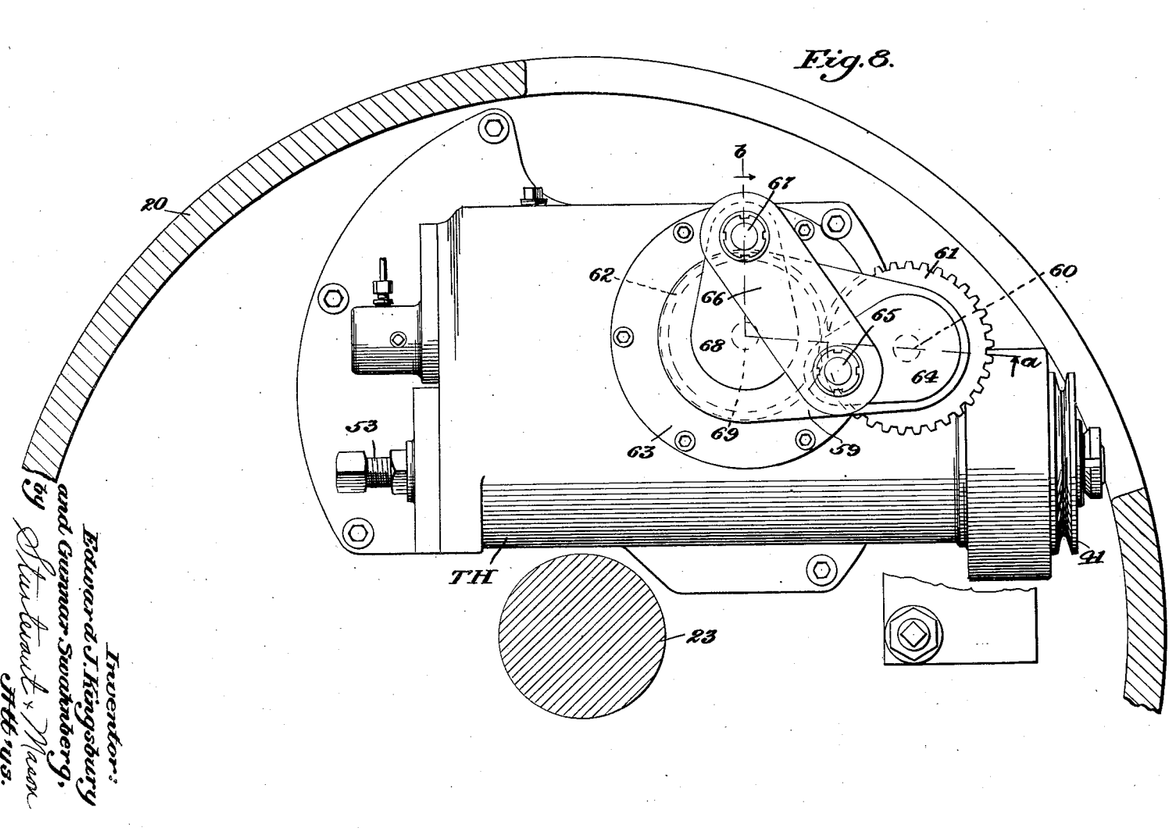
Figure 8 is a horizontal sectional view substantially on lines 8—8 of Figures 3 and 4, showing the traveling gears and the housing for the turret driving structure from the bottom, the gears being in one position of operation.

The lower end of shaft 60 is provided with a radially extending arm 64 having a pivot pin 65 adjacent its free end. This pivot pin engages the connecting link 66 which is likewise engaged with a similar pivot pin 67 carried by the radially extending arm 68 of the central shaft 69 located within the sleeve 56 and supported with respect thereto at its lower end by an anti-friction bearing 70, and at its upper end by a bearing bushing 71. In Figure 7, in order better to illustrate the parts, it has been assumed that the link 66 is broken and the two pins moved until they are in a single plane.

A spur gear 72 is fixed at the upper end of the shaft 69 and is in mesh with a spur gear 73 fixed to the lower end of the turret turning shaft 74. This shaft 74 is journaled in an axially slidable bushing 75 which is provided with rack teeth 76 engaged by the pinion teeth 77 on a turret releasing shaft 78 which will be described in detail hereinafter. The shaft 74 is preferably provided with an anti-friction bearing 79 to support it against downward end thrust. The upper end of the shaft 74 is provided with a gear 80 having slightly skewed teeth and constituting the turret turning gearing which is in mesh with the correspondingly skewed teeth of the gear 30, shown in Figures 2 and 7.

Figure 3:
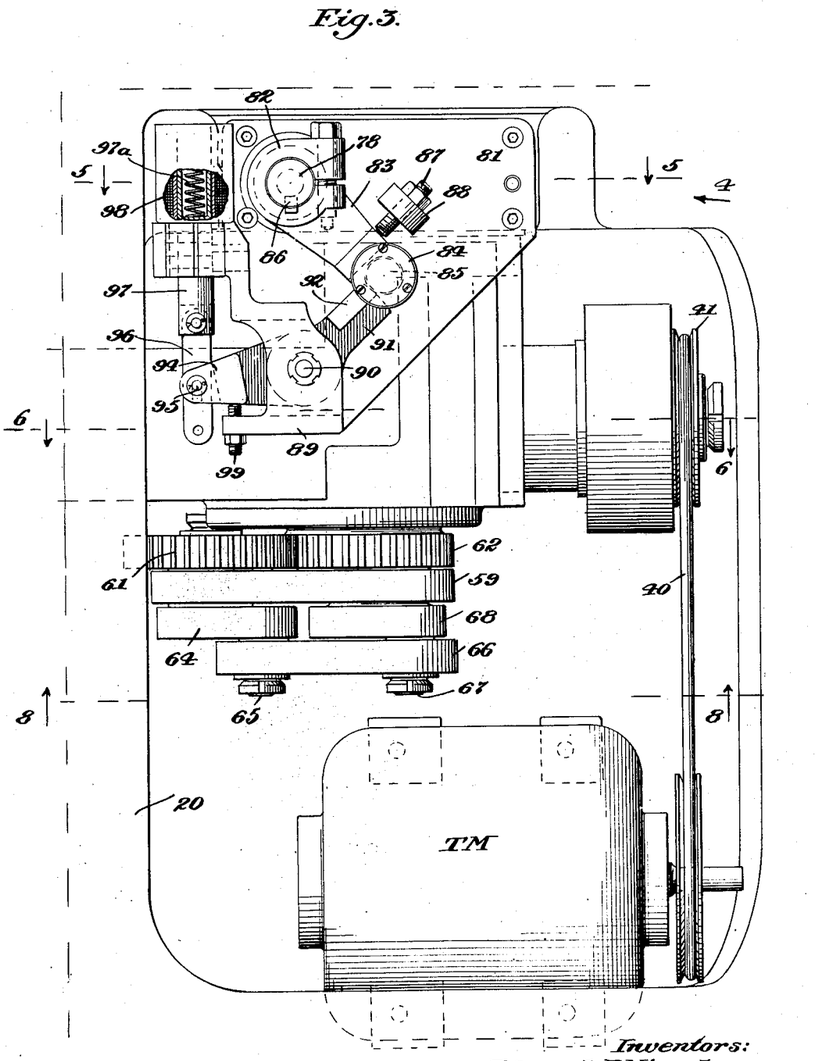
Figure 3 is a detail view, in elevation, on a much larger scale, taken substantially in the direction of the arrows in Figures 4, 5 and 6.
Figure 4:
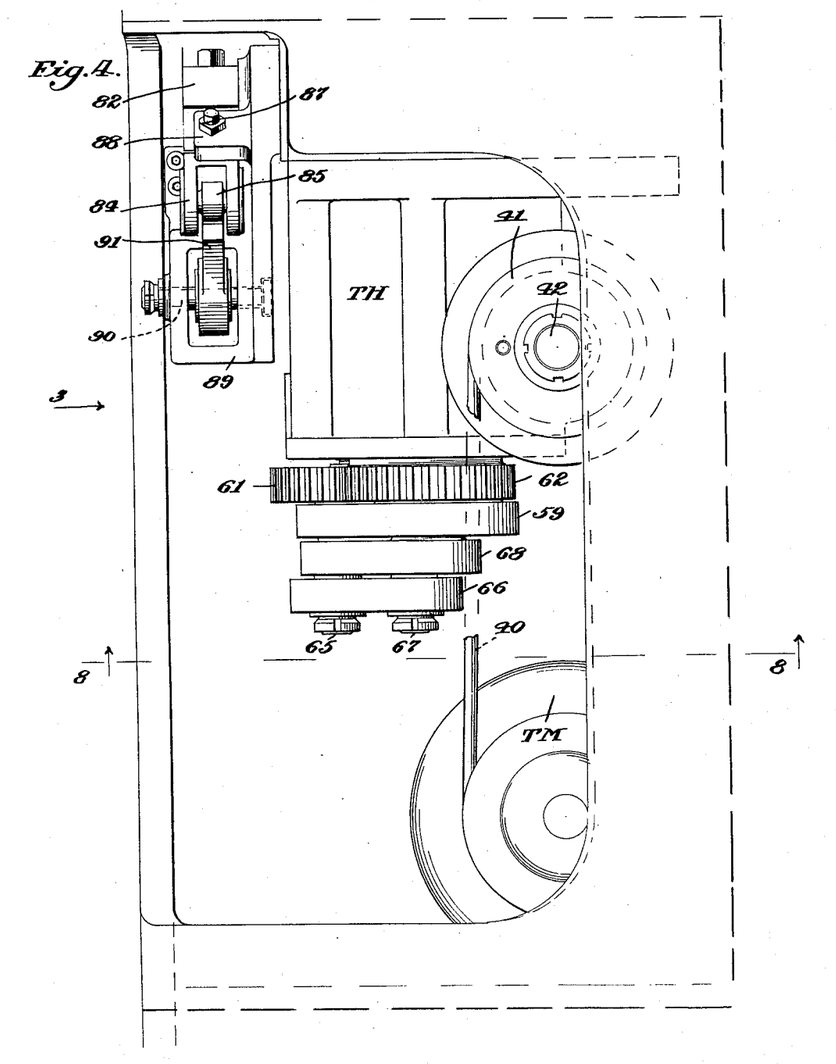
Figure 4 is a similar enlarged elevation detail view taken substantially in the direction of the arrows in Figures 3, 5 and 6.

The turret releasing shaft 78 (Figures 3, 5 and 7) is supported in the walls 43 and 44 by the release mechanism plate 81 fixed to wall 43. At the outer end of the shaft 78 is clamped a split collar 82 having an extension arm 83 terminating in the bifurcated end 84 in which is journaled a roller 85. The key 86 is preferably employed to assure the rigidity of the arm 83 with respect to the shaft 78. The counterclockwise movement of shaft 78 and arm 83 (Figure 3) is limited by an adjustable abutment screw 87 which passes through an ear 88 on plate 81. The plate 81 has integral therewith or attached thereto the support bracket 89 which receives a pivot bolt 90 for the releasing trip lever having the arm 91 with an abutment plate 92 thereon, and a second arm 94 supporting a pivot 95 which is engaged in a slot of a link 96 pivotally connected to the plunger armature 97 of a solenoid 98 which is likewise supported on the bracket 89 and plate 81. The bracket 89 also supports an adjustable abutment screw 99 for limiting the counterclockwise movement of the lever 91—94. When the arm 83 is in its extreme counterclockwise position, as shown in Figure 3, the action of spring 97a and the weight of the plunger 97 and associated parts causes a counterclockwise rocking of the lever 91—94 so that the abutment plate 92 is brought into position between the roller 85 and the axis of pivot pin 90, and thus prevents any clockwise movement of the arm 83 until the solenoid 98 has been energized.

As shown in Figures 13, 14 and 15, turret table 25 is provided at its lower surface, adjacent the periphery, with abutment or stop members 100 which are provided in number equal to the number of stations, i. e. four corresponding to the number of work receiving vises WV in the present illustration. These stop members are arranged at the proper angular distances to determine the position of the turret accurately at each station, being separated 90 degrees from one another peripherally in the present illustration. These stop members are held in proper position by the aligning pins 101 carried by the turret table 25 and are held by the locking screws 102. Each member has a bottom surface 104 which is located substantially in a plane at right angles to the axis of rotation of the turret table 25, and a stop surface 105 which is preferably located in a plane passing through this axis. It will be noted that the turret table 25 is cut away to permit engagement of the stop member with the stop surface 105, as will be set forth hereinafter, and that this gap or cut-away portion of the table 25 terminates in an inclined surface 25a.

Cooperating with these stop members is a detent plunger 106 having an inclined surface 107 for cooperation with the inclined surface 25a, a flat end surface 108 for cooperation with surface 104, and a surface 109 directed axially for cooperation with the stop surface 105. This plunger is guided in a sleeve 110 supported by the structure of the upper closure wall 21, and has an eccentric aperture therein for receiving the spring 111 which normally urges the plunger 106 upwardly, and a pin 112 which forms the lower abutment for this spring. The pin 112 is supported by an angle bracket 113 carried by an extension from the cylindrical wall 20. Fixed to the plunger 106 is a crossarm 114 (Figures 5, 14 and 15) having an aperture at its end engaged with a pin 115 carried by the plate 21 for holding the plunger 106 in proper position for engagement with the stop members. The lower surface of the plunger 106 (Figures 14 and 15) engages a roller 116 carried by an arm 117 of a switch TS. When the plunger 106 is forced downward by the engagement of inclined surface 25a with inclined surface 107, the contacts of switch TS are separated.

Figure 16:
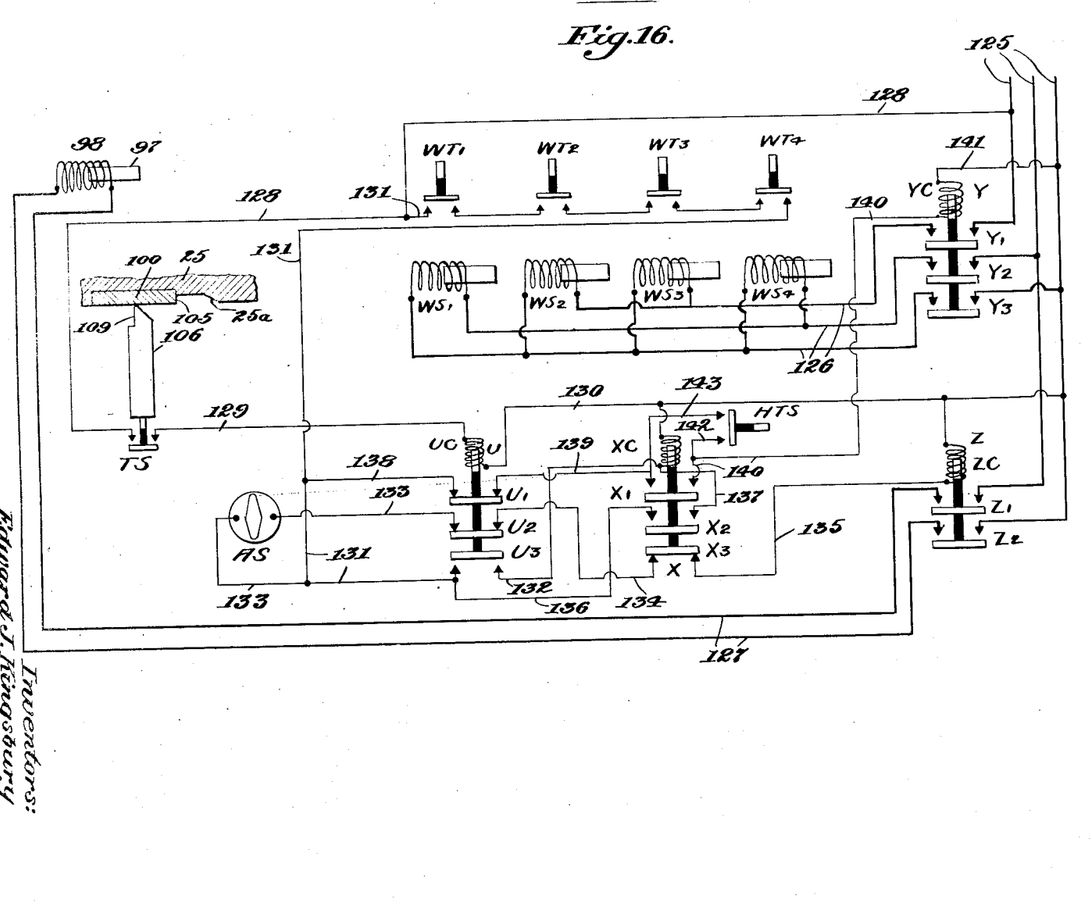
Figure 16 is a circuit diagram of the apparatus shown in Figure 1.

In the circuit diagram of Figure 16, the switches provided in the work units W1, W2, W3, W4 are shown at WT1, WT2, WT3, WT4, these switches being individually closed when the work unit completes a cycle and returns to withdrawn position, in the manner described in the aforesaid applications. Accordingly, also, the trip solenoids for these work units are illustrated at WS1, WS2, WS3, WS4, the operation thereof being to release the respective work units so that they may thereafter automatically operate and complete an operating cycle, and return to the aforesaid withdrawn and inoperative position and be latched therein until the solenoids WS1, WS2, WS3, WS4 for the corresponding work unit have again been energized.

In this diagram, the three supply conductors 125 (of a three-phase system) are connected to contacts which may be closed by the bridges Y1, Y2, Y3 of a trip relay Y for initiating the working cycles of the working units. Two of these conductors are also joined to contacts which may be closed by the bridges Z1 and Z2 of the trip relay Z for initiating an indexing movement of the turret table. From the associated contacts of the trip relay Y, conductors 126 extend to the solenoids WS1, WS2, WS3, WS4 of the work units and in essence connect these in multiple so that they are all energized at the same time and, correspondingly, the working units initiate their movements simultaneously. Correspondingly, the conductors 127 lead from associated contacts of bridges Z1 and Z2 of relay Z for energizing the solenoid 98 which trips or releases the turret advancing mechanism.

A pilot circuit conductor 128 extends from one phase conductor 125 to a contact in switch TS which is closed so long as the locking pin or plunger 106 is in its raised position, and thence by a conductor 129 and the coil UC of a starting relay U, and thence by conductor 130, back to another phase conductor 125. The starting relay U has three bridges U1, U2, U3. A branch conductor 131 from conductor 128 connects the switches WT1, WT2, WT3, WT4 in series and is connected (by branch conductor 138) to a contact of bridge U1 which is closed when the relay U is energized, and to a contact bridge U3 which is closed when the relay U is de-energized. The associate contact of bridge U3 is connected by a conductor 132 with the coil XC of a relay X, the other terminal of which is joined to the return pilot conductor 130. A switch AS is provided for manually controlling the initiation of each indexing cycle by momentarily closing the switch, and also effective for producing a fully automatic operation of the apparatus when maintained closed. A conductor 133 branches from conductor 131 and is controlled by switch AS and is joined to a contact which is closed by bridge U2 when the relay U is energized. The associate contact of bridge U2 is joined by a conductor 134 with a contact of bridge X3 of relay X, which is closed when the relay X is de-energized; the associate contact of bridge X3 being joined by a conductor 135 with the coil ZC of the turret indexing trip relay Z, the other terminal of the coil ZC being connected to the return pilot conductor 130.

Likewise branched from conductor 131 is a conductor 136 which is joined to a contact which is closed by bridge X2 of relay X when this relay is energized, the associate contact of bridge X2 being connected by a conductor 137 to conductor 132, so that bridge X2 therefore operates to complete and maintain a circuit for the coil XC when the relay X is energized.

The further branch conductor 138 leads to a contact which is closed by bridge U1 when the relay U is energized, the associate contact of bridge U1 being joined by a conductor 139 to a contact of bridge X1, which is closed when relay X is energized; and in turn the associate contact of bridge X1 is joined by a conductor 140 to the coil YC of the trip relay Y with a return by conductor 141 to a phase conductor 125.

In order to provide a means for starting the heads independently of the turret mechanism, a hand trip switch HTS is provided for closing contacts and thereby establishing a circuit by branch conductors 142 and 143 between conductors 139 and 140 independently of the operation of relay X.

With the four heads W1, W2, W3, W4 approaching their withdrawn and inoperative positions, after having each completed a cycle of operation, they close their associated switches WT1, WT2, WT3, WT4 in any order. Finally all of the heads have returned to the withdrawn position and are latched therein and all of these switches are closed. At this time, also, the turret is still remaining fixedly held at a definite position of advancement, with the several work vises WV properly presented for the operation which has been produced by the working units. At this time the surface 109 of the plunger or lock pin 106 is engaged with the stop surface 105 and the plunger 106 is in raised position so that the switch TS is closed. The relays X, Y and Z have been de-energized. The motor TM is rotating and driving the pulley 41 and its shaft 42, but the resistance of the turret table 25 against retrograde movement owing to the engagement of surfaces 105 and 109 has caused the clutch elements 46 to become disengaged so that no drive is occurring from shaft 42 to the worm 48, although the spring 52 is maintaining the stop member 100 tightly engaged with the plunger 106. The turret driving skew gear 80 and its shaft 74 are in the lowermost position; the arm 83 being latched in its counterclockwise position by the abutment plate 92 (position of Figure 3).

The plunger or lock pin 106 is in its raised position and switch TS is closed, so that a circuit exists by conductor 128, switch TS, conductor 129, coil UC, and return pilot conductor 130. Relay U is thus held in energized position with bridges U1, U2 closed and bridge U3 open. The circuit through bridge U1 is open at relay X. The circuit through bridge U2 is closed at bridge X3, but has been held open by at least one of the heads WT1, WT2, WT3, WT4, and possibly by the switch AS.

At the moment that the last of the switches WT1, WT2, WT3, WT4 closes, it completes a series circuit by conductors 128, 131, the switches, conductor 133 and switch AS to bridge U2, by conductor 134 and closed bridge X3 and conductor 135 to coil ZC, and thus to return conductor 130, energizing coil ZC of relay Z.

The closure of relay Z causes the energization of the indexing trip solenoid 98, so that its plunger 97 (Figure 3) moves the lever 91—94 and the abutment plate 92 is drawn away from the roller 85. The weight of the arm 83 and associated parts, and also the axial thrust existing between the skew gear 80 and the skew gear 30 on the turret table 25, causes a clockwise movement of the arm 83 and its shaft 78, so that the teeth 77 causes an upward movement of shaft 74 and skew gear 80. This results in a slight relative movement of the gear 80 in a rearward direction under the action of spring 52, while the turret table 25 is still held fast by the engagement of surfaces 105 and 109. The result of this rearward movement of the gear 80 is to permit the system including the traveling gear to pass the rearward dead center and begin the upward movement, as will be described in detail hereinafter in conjunction with the chart of operation. The rearward movement of skew gear 80 also permits the reengagement of the clutch elements at 46, so that the motor TM begins its drive of the system.

As a result of this upward movement, the turret table 25 is moved so that the surfaces 105 and 109 separate, and shortly thereafter the inclined surface 25a in the said annular portion of the lower turret table surface causes a depression or downward movement of the plunger or lock pin 106 so that the switch TS is opened. This breaks the circuit through conductors 128 and 129 and de-energizes the coil UC so that the relay U moves to open position, and the circuit which has been closed therethrough at bridge U2 is open and relay Z de-energized. The solenoid 98 is thus de-energized and its releasing lever 91—94 moves in a counterclockwise direction (Figure 3). Meanwhile, the rotation of gear 80 in a forward direction through the driving system, including the traveling gearing, has caused an axial downward movement thereof accompanied by a rocking of shaft 78 and thus of arm 83 in a clockwise direction, so that the roller 85 is held ready for immediate latching when the abutment plate 92 swings upward with the arm 91; thus restoring this portion of the system to the former position.

The work unit switches WT1, WT2, WT3, WT4 continue closed, as these units have not been tripped for further operation, and the circuit extending in series therethrough and by conductor 131 is now closed at bridge U3 and extends by conductor 132 to coil XC and to return conductor 130, thus energizing coil XC and closing relay X. The bridge X2 of this relay now establishes a temporary maintaining circuit from conductor 131 by conductor 136, bridge X2 and conductor 137 to the coil XC. The relay X also serves to open the circuit previously existent by conductors 134 and 135 at bridge X3; and to tentatively close a circuit through conductors 139 and 140 at bridge X1.

The turret plate 25 continues to turn until it presents the next stop member 100 to plunger 106, and finally permits the plunger 106 to be forced back for closing the switch TS when surface 105 of this stop member has passed the surface 109 on plunger 106. As described hereinafter, the traveling gearing causes the turret table to move slightly beyond this position in the forward direction and then to return with a retrograde movement until the surface 105 is presented against the surface 109 and therewith the turret plate is again brought to a standstill against movement in this retrograde direction under the action of the motor TM, which has always continued to turn in this single direction, the forward and retrograde movements of the turret plate being produced by the traveling gearing, as will be described hereinafter.

When the plunger 106 moves upward after the passage of the stop member 100, the switch TS is closed again and the circuit is again established by conductor 128, switch TS, conductor 129, coil UC, and return conductor 130, thus energizing the relay U again. This relay now opens the bridge U3 and closes the bridges U1 and U2. The circuit through bridge U2 by conductor 134 is now held open at bridge X3 since the relay X is energized. The relay X is maintained energized through the conductor 136, and bridge X2 as described above. A circuit is established by conductors 131, 138, bridge U1, conductor 139, bridge X1, conductor 140, coil YC, and conductor 141 back to the phase conductor 125, resulting in the energizing of relay Y and the tripping of the work units W1, W2, W3, W4 by their corresponding solenoids WS1, WS2, WS3, WS4. It will be understood that the time required for the starting of the units is greater than that required for the completion of the movement of the turret until the surface 105 of this stop member 100 engages the surface 109 of the plunger 106.

This release of the working units, however, results immediately in the opening of the switches WT1, WT2, WT3, WT4, the opening of the first of which produces a de-energization of circuits including the conductor 131, so that the maintaining circuit by conductor 136 for coil XC is now broken and the relay X moves to open position again. This energization of the relay X results in the opening of its bridge X1, so that the coil YC of relay Y is de-energized and the trip solenoids WS1, WS2, WS3, WS4 are de-energized, and the structures operated thereby are presented ready for latching the corresponding work units as each of these returns in completing a cycle.

The parts have now essentially returned to the positions assumed above as that for the beginning of a cycle. That is, the relays X, Y and Z are open, the relay U is closed, the several solenoids are de-energized, switches WT1, WT2, WT3, WT4 are open, and switch TS is closed. So long as the switch AS is closed, this cycle will repeat itself; but upon opening the switch AS, the final cycle is completed, but a new indexing of the turret is not initiated. Movement of the heads may be incited, without movement of the turret table, by closing the hand switch HTS. A circuit is thus established from conductor 128 through the switches WT1, WT2, WT3, WT4 by conductor 131, conductor 138, bridge U1, conductor 139, conductor 143, the bridge of switch HTS, conductor 142, conductor 140, coil YC and conductor 141 back to a phase conductor. It will be noted that this manual operation can only be accomplished if the turret is at station, i. e. if the plunger 106 is in its raised position with switch TS, so as to maintain the relay U energized; as otherwise the bridge U1 will interrupt this circuit. This also affords a protection against the dragging of the work in a peripheral direction while a drill or like tool is being fed or withdrawn.

Reference has been made above to the operation of the traveling gearing in producing both forward and retrograde movements of the turret table 25. In particular, the illustrated form of traveling gearing causes (starting from the beginning of the above cycle) a slight retrograde movement followed by an accelerating forward movement of large extent, a decelerating movement of large extent, and a slight retrograde movement for again presenting the stop surface 105 to the surface 109.

Figure 17:
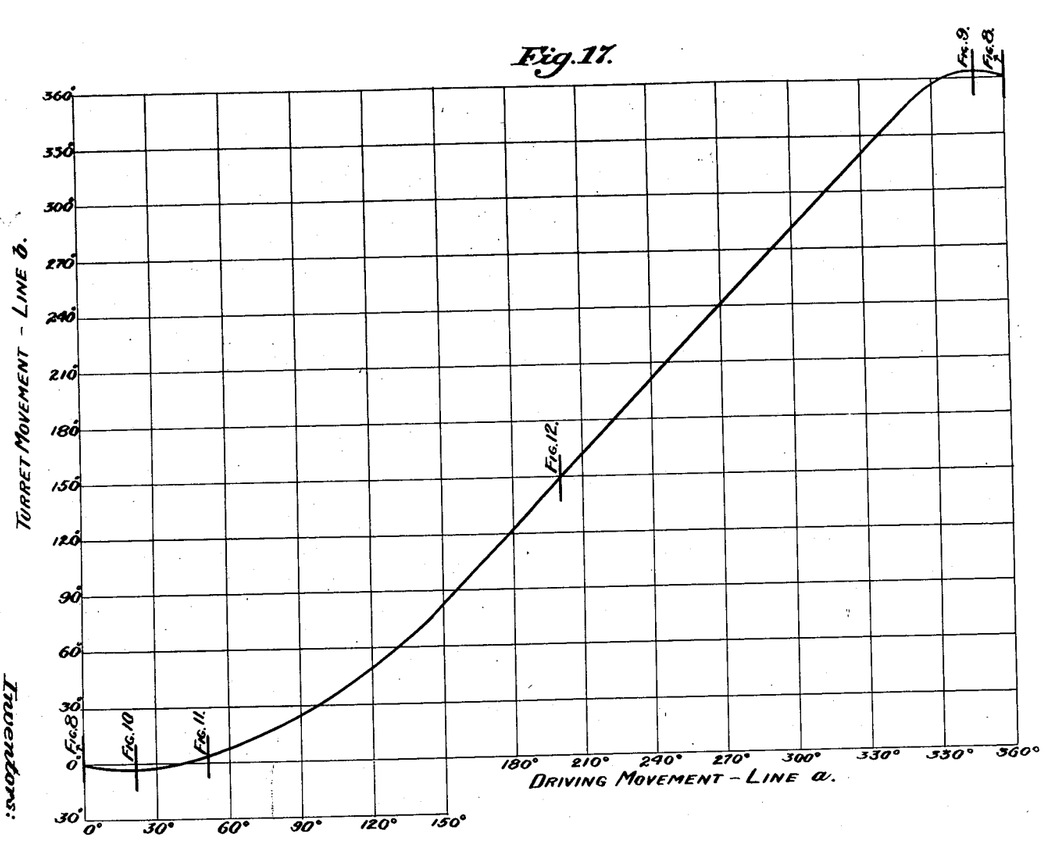
Figure 17 is an operation chart indicating the course of a single turning movement of the turret structure.

This is shown in the operation chart of Figure 17, in conjunction with the position of the traveling gearing as shown by Figures 8 to 12. In this it is assumed that the turret is at a standstill when the traveling gearing (line a) is in the position of Figure 8. Upon release, a slight further retrograde movement of the turret (line b) occurs, as stated above, from the position of Figure 8 to the position of Figure 10, which represents (Figure 17) the end of the retrograde movement. The turret thereafter begins a further forward indexing movement which accelerates from the position of standstill corresponding to Figure 10, past the position of Figure 11, and continues its acceleration for about one-half of the indexing movement, corresponding to the position of Figure 12, and then toward the end of this forward movement a deceleration occurs until the parts attain the position of Figure 9, which represents the end of the forward indexing movement with the turret table substantially at a standstill. The operation of the traveling gearing, however, does not terminate at this point, as no element is now operating to hold the turret table or its associated gearing against relative movement. Hence the traveling gearing (line a) continues to cause until it returns to the position of Figure 8, a slow retrograde movement of the turret (line b) of limited extent, whereby the surfaces 105 and 109 are brought into contact as pointed out above and the turret table is again held against movement, the aforesaid clutch members 48 slipping but operating in conjunction with their spring and through the worm drive for maintaining a constant pressure between these surfaces so that the turret table is held in its proper position at this station. It is particularly pointed out that the surfaces 105 and 109 are engaged during retrograde movement, and while the turret table is turning slowly, so that there is no great shock of impact with the attendant possibility of upsetting or otherwise mutillating these surfaces. They thus maintain their accuracy for long periods of time, and it is possible to accomplish minor variations by interchanging the member 100, for example, or filing or grinding its end to provide a surface 105 at the proper position. Since one of these stop members 100 is provided for each station, the position of rest at each station may be adjusted independently of the position at any other station.

During the cycle of movement of the turret table, the motor TM turns constantly and at a substantially uniform rate in a single direction. It thus drives the shaft 42, and through the clutch elements 46, the worm 48 and worm wheel 55, so that the arm 59 (Figures 7–12) tends to turn at a uniform angular rate. In turning, it carries the pivot shaft 60 of the gear 61 bodily with it, and the gear 61 rotates upon the gear teeth 62 which constitute a circular rack in mesh therewith. The gear 61 therefore rotates at a constant rate and its arm 64 (line a) likewise turns with a constant angular velocity. This arm, however, through the pivot pin 65 produces a type of harmonic motion of the link 66, so that the pivot 67 and the arm 68 are turned at varying rates, dependent upon the particular angular position of the arm 59. Thus, in the position of rest of Figure 8, the arm 59 is being urged in a counterclockwise direction by the action of spring 52, while the clutch elements 46 are slipping. The gear 61 is likewise turning in a counterclockwise direction relative to the axis of its shaft, and is carrying the arm 64 with it, so that the link 66 is being dragged downwardly and toward the right (Figure 8) and is tending to produce a limited clockwise movement of the arm 68. At the position of Figure 8, as stated above, this clockwise movement of arm 68 is limited by the engagement of stop surfaces 105 and 109.

Figure 10:
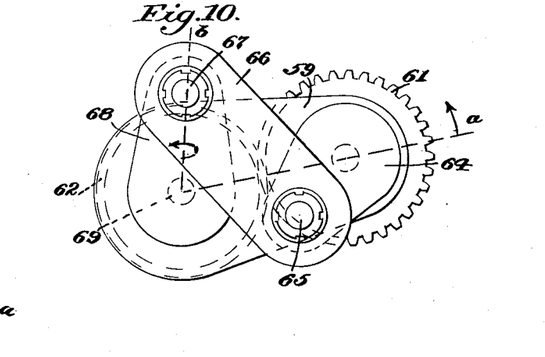

When the shaft 78 is operated to raise the skew gear 80, as stated above, a clockwise movement of shaft 74 and arm 68 is permitted, so that this arm may move to the position of Figure 10. Therewith the spring 52 operates to restore the engagement of clutch elements 46 and the gear 71 travels in a counterclockwise direction about its own axis, and travels bodily in a counterclockwise direction with the arm 59. The link 66 operates to control the relation of pivot pins 65 and 67 so that the position of Figure 10 is attained.

The further bodily movement of arm 59 in a counterclockwise direction produces two components of motion of pivot 65. One of these components is a counterclockwise movement about the axis of arm 64 and the other is a traveling of the pivot 65 in a general counterclockwise direction with respect to the axis of the arm 59. The resultant of these two motions is that of causing a dwell or standstill of the pin 67 (position "Fig. 10" of Figure 17).

Figures 11, 12:
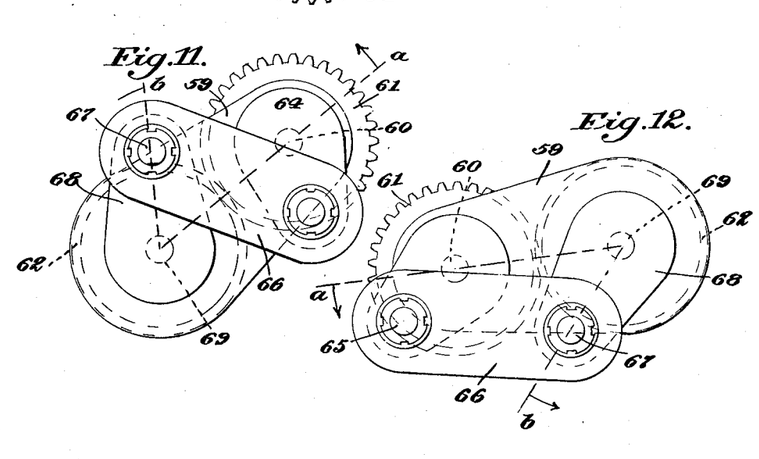

As the pin 65 continues to move in a clockwise direction relative to the axis of gear 61, and this gear continues to travel, the pin 67 is forced in a counterclockwise direction by link 66 relative to the axis of the arm 68, so that the arm is moved to produce the aforesaid forward indexing movement of the turret table. Since the pin 65 is moving in a counterclockwise direction relative to the axis of arm 59, on the one hand, and is being moved away from the axis of this arm by the movement of arm 64, on the other hand, the general resultant is to produce an accelerating movement which reaches its maximum when the arms 64 and 68 are substantially parallel (Figure 12).

Figure 9:
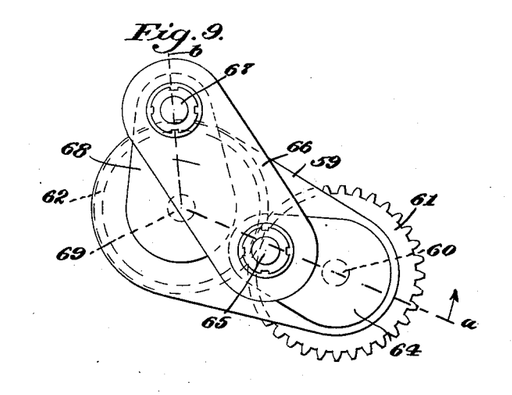
Figures 9–12 are diagrams of the traveling gears, on the scale of Figure 8, in several operated positions.

The continued movement of the arm 59 causes the two arms to move for a time with substantially the same angular velocity, in the particular illustrative form, until the parts attain substantially the position of Figure 9. Just prior to attaining the position of Figure 9, the arm 64 is in alignment with link 66, so that the axes of shaft 60, pivot pin 65 and pivot pin 67 lie in the same plane. This represents the greatest distance that pivot pin 67 can attain with respect to the axis of gear 61, and constitutes the extreme forward movement of the arm 68 for this cycle of indexing movement. As the arm 64 passes this dead center position, the distance between the pin 67 and the axis of the gear 61 decreases, while the pivot pin 65 is being carried relatively backward or in a clockwise direction with respect to the axis of arm 59. This causes the link 66 to drag the arm 68 in a clockwise direction again to produce the aforesaid slow and slight retrograde movement, until the parts attain the position of Figure 8 in which the locking surfaces 105 and 109 are engaged again.

Thus it will be noted that both the extensive forward indexing movement and the slight retrograde movement occur harmonically, that is there is an acceleration at the beginning of such movement, following by a deceleration toward the end of the movement. By these means, the maximum appropriate speed is attained, without excessive expenditure of energy and without danger of damage to the parts or the necessity of heavy structures by inertia effects.

By modifying the position of pin 67 relative to the axis of arm 68, and of pin 65 relative to the axis of arm 64, as well as by proper selection of the operative length of the link 66, the desired harmonic relations and desired relative distances of forward and retrograde movement may be produced. Further by proper selection, or interchange, of the gear 61 relative to the gear teeth 62, the device may be caused to operate for different general conditions of such motions. Further, by replacing the gears 72 and 73, it is possible to cause the structure to index properly for any given number of stations on the turret. In the specific example, it is assumed that the relative gear ratios 72:73 and 80:30 produce successive movements of 90 degrees. By maintaining the gear 72 smaller and the gear 73 larger in the relative proportion 2:3, the turret table will be moved for increments corresponding to 60 degrees, or six stations to the circumference, of course with a proper replacement and positioning and use of six stop members 100.

Figure 6:
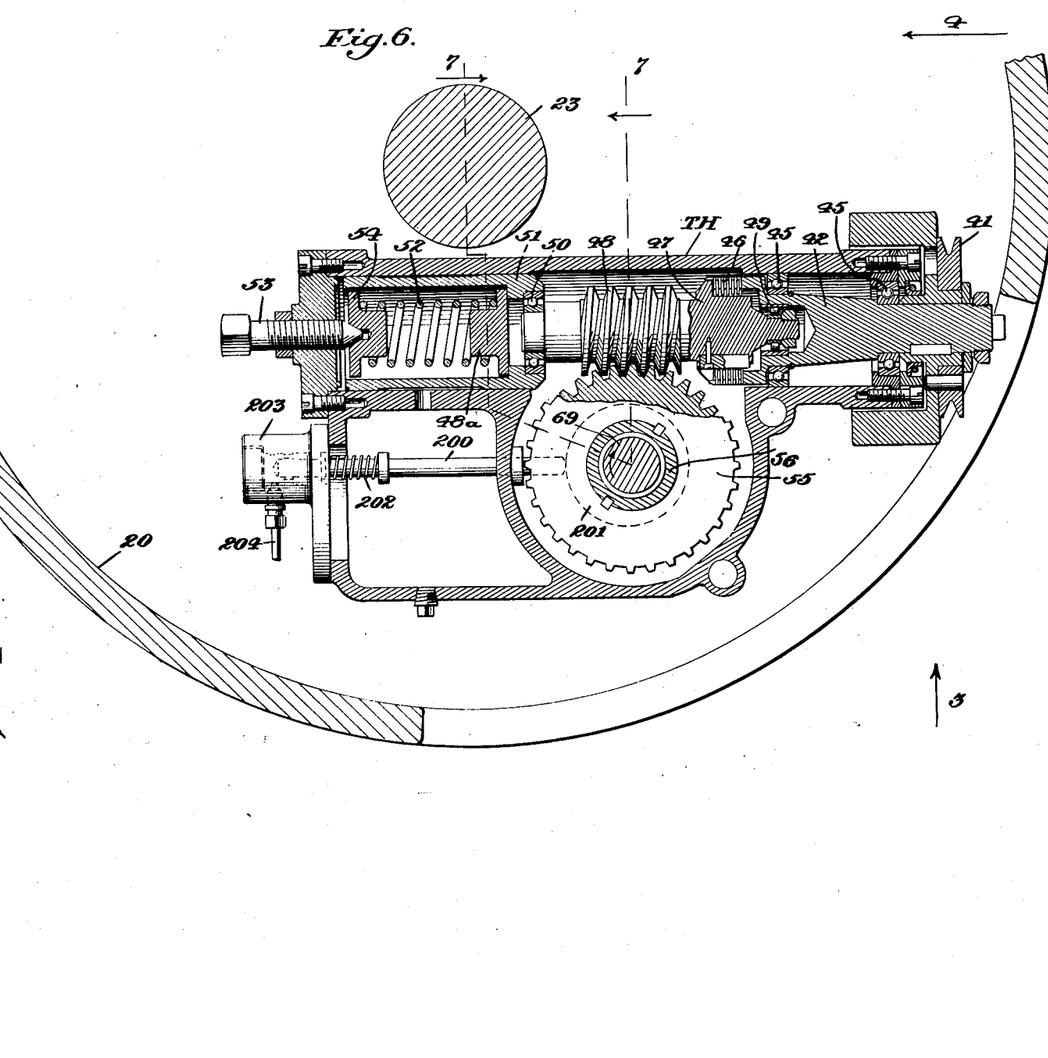
Figure 6 is a similar horizontal sectional view substantially on lines 6—6 of Figures 3 and 7.

In the illustrated form, at Figure 6, a plunger 200 is operated by a cam 201 on shaft 69 against the action of return spring 202 for actuating a pump 203 which may supply lubricant through a conduit 204 to portions of the device which require lubrication.

It is obvious that the invention is not limited to the specific form of embodiment illustrated and described, but that it may be employed in many ways within the scope of the appended claims.

Having thus described the invention, what we claim as new and desire to secure by Letters Patent is:

1. In a device of the class described, a member which is to be advanced by a succession of increments and to occupy predetermined definite positions between each two increments, a source of power, means including a release device for connecting said source in driving relation with said member and also including devices to cause said source to produce in succession a long advancing movement and a short retrograde movement, detent means for preventing the completion of the retrograde movements of said member and thereby operating to determine the said definite positions, said release device operating to interrupt the driving relation when said detent means is operating to determine a said definite position, and means in said connecting means to compensate for the remainder of each said retrograde movement so that said connecting means may operate to produce the long advancing movement for the next increment.

2. In a turret structure, a turret to be cyclically advanced and brought to a standstill, a source of power constantly operating in one direction, means for connecting said source in driving relation with said turret and including a release device operating when the turret is blocked against further movement, said connecting means also including devices operating automatically to produce successively a long advancing and a short retrograde movement, a detent for limiting retrograde movement of the turret and thereby causing the turret to come to a standstill at a predetermined position at the end of a cycle, and means in said connecting means between the automatically operating devices and said turret to compensate for the remainder of each said retrograde movement and serving when operated to initiate a new cycle of movement of the turret.

3. In a device of the class described, a turret member and a tool holding and operating member, individual means for driving said members, first detent means for holding said turret member in position for a tool operation, second detent means for holding said tool member out of operating position, first control means operated from said tool member when out of operating position, second control means operated from said turret member when entering position for a tool operation, first devices actuated through said second control means when operated for initiating an indexing movement of said turret member, supervising devices for de-energizing said first devices when the turret member has made an initial movement and operating to effect the further indexing movement of the turret member until stopped by said first detent means, second devices actuated through said first and supervising devices to release said second detent means, and means including said first control means for restoring said first, second and supervising devices and said second detent means to initial position when said first control means is released from operation by said tool member.

4. In a device of the class described, a member which is to be advanced by a succession of increments and to occupy predetermined definite positions between each two increments, a source of power, means for connecting said source in driving relation with said member and including teeth fixed to said member and a toothed element in said connecting means in mesh with said teeth, said teeth being at an acute angle to the direction of advancement of the member, said connecting means also including devices for producing a long advancing movement and then a short retrograde movement of said member, detent means for preventing the completion of the retrograde movements of said member and thereby operating to determine the said definite positions, and releasing means operating to produce a relative movement of said teeth and toothed member in a direction other than that of the advancement of said member to compensate for the remainder of each said retrograde movement.

5. A device as in claim 4, in which said toothed element is a skew gear, and said releasing means operates to move said skew gear axially.

6. A device as in claim 4, in which said toothed element is a skew gear, and said releasing means operates to move said skew gear axially and thereby produce the said compensating movement in the connecting means, the source of power operating by the reaction of said teeth and toothed member to produce a restoring axial effort upon said toothed element during the advancing movement of said member.

7. A mechanism for producing cyclically in succession a long advancing angular movement and a short retrograde angular movement of a revoluble member, comprising a source of power, an arm rotated by said source, a fixed gear coaxial with said arm, a traveling gear rotatably carried on said arm and in mesh with said fixed gear, a second arm rotated with said traveling gear, a third arm on said shaft, and means pivotally connected to said second and third arms at points respectively eccentric to said traveling gear and said shaft.

8. A turret mechanism including a frame, a revoluble turret member, a stop element on said turret member having an inclined forward surface and a rearward stop surface substantially at a right angle to the line of movement of the turret member, a yielding stop plunger on the frame cooperative with the stop element to be moved axially by said inclined surface and having a stop surface positioned for engaging said rearward stop surface when said plunger returns after its said axial movement, said stop surfaces limiting retrograde movements of said turret member, and means for producing successive advancing and retrograde movements of said turret member and including devices for compensating the remainder of retrograde movements following limitation thereof by said stop surfaces.

9. A turret mechanism as in claim 8, including a switch actuated by said plunger during its axial movements.

10. A turret mechanism as in claim 8, including a control element actuated by said plunger during its axial movements, and turret controlling means governed by said control element.

11. A machine tool comprising a hollow base, an upright center column rigidly supported by said base against axial and rotational movements, a turret table rotatable about said column and supported by said hollow base, a tool unit slide rigidly supported above said table by said column against axial and rotational movements, at least one tool unit supported by said tool unit slide, an indexing mechanism located in and supported by said hollow base for advancing said table, said tool unit and indexing mechanism each including an individual source of power, and control means including a device actuated by said tool unit when the tool is in withdrawn position, and a device actuated by said turret table when substantially in position for tool operation for effecting interlocked successive operations of the tool unit and turret table.

12. A turret mechanism including a frame, a turret, a source of power, means connecting the source in driving relation with the turret and including devices for producing an accelerating advancing movement and then a deceleration thereof until the turret is at a standstill so that minima of time and inertia effects are involved for an advancing movement of large total angular extent, and thereafter producing an accelerating and then a decelerating retrograde movement of the table of small total angular extent, and detent means for preventing the completion of each retrograde movement.

13. In a turret structure, a frame, a turret to be cyclically advanced and brought to a standstill relative to the frame, a source of power operating constantly in one direction, means for connecting said source in driving relation with said turret, a detent for limiting retrograde movement of the turret and thereby causing the turret to come to a standstill at a predetermined position at the end of a cycle, said connecting means including devices operating automatically to produce successively a long advancing and a short retrograde movement, and means for initiating cycles of movement of the turret from said source.

14. A turret structure as in claim 13, in which the connecting means includes an axially movable worm driven from said source and a worm wheel in mesh therewith and connected to said turret, a release clutch disengaged by said worm during axial movement produced by the continued movement of the source when the driving of the turret is blocked, and resilient means for opposing said axial movement and restoring the clutch to engaged position when the turret drive is released, said resilient means also operating while the clutch is disengaged for holding said turret and detent in continued engagement and thereby maintaining the turret in its prevailing predetermined position of standstill.

EDWARD JOSLIN KINGSBURY.
GUNNAR SWAHNBERG.